April 13, 1937.  F. H. SNYDER ET AL  2,077,059
RECLAIMING FIBER FROM WASTEPAPER
Filed May 23, 1934
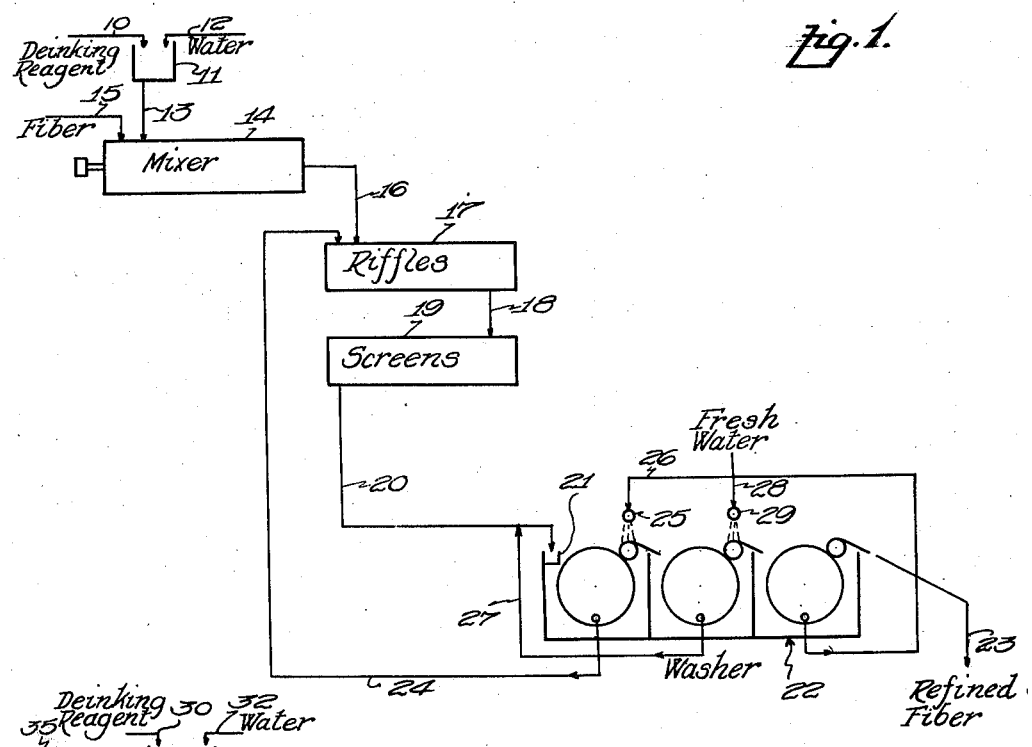
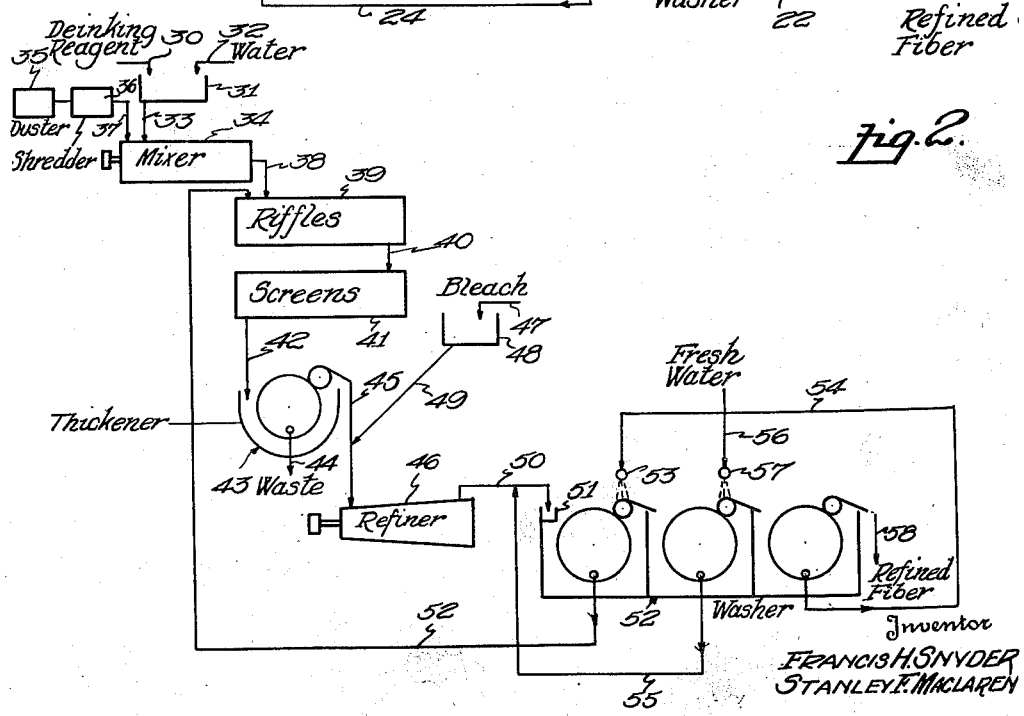
Inventor
FRANCIS H. SNYDER
STANLEY F. MACLAREN
By C. L. Parker Jr.
Attorney Patented Apr. 13, 1937

2,077,059

UNITED STATES PATENT OFFICE 2,077,059

RECLAIMING FIBER FROM WASTEPAPER

Francis H. Snyder and Stanley F. M. Maclaren, New York, N. Y., assignors to Snyder Maclaren Processes, Inc., New York, N. Y., a corporation of Delaware Application May 23, 1934, Serial No. 727,120

8 Claims. (Cl. 92—20)

This invention relates to the reclaiming of fiber from waste paper and more particularly to a process of deinking waste printed papers such as newsprint, magazine stock and the like.

The principal object of this invention is to provide a process of recovering fiber from waste paper which is more rapid in operation and productive of a higher quality of recovered fibers than similar processes heretofore used.

An important object of the invention is to provide a simple, efficient, and commercially practicable process of deinking waste paper and recovering usable fiber therefrom.

A further object of the invention is to provide an improved process of deinking waste paper wherein the deinking is effected while the fiber is in a suspension of relatively high density.

A further object of the invention is to provide a continuous process of deinking waste paper and recovering usable fiber therefrom.

Other objects and advantages of the invention will become apparent during the course of the following description.

As is well known, deinking of waste paper is ordinarily effected by subjecting a relatively dilute suspension of the waste paper to the action of a deinking reagent. Generally, a low density suspension, say a five per cent. suspension, of the waste paper is treated in a beater or digester in the presence of one or more chemicals for the purpose of removing ink and other extraneous matter from the fibers. This process has uniformly been practiced on the basis of batch treatment.

We have now discovered that more effective deinking may be accomplished, the speed of operation greatly increased, and a continuous process provided if, instead of carrying out the deinking operation on a low density suspension, a high density suspension, say from ten to sixty per cent. solids by weight, is employed during the deinking operation. On the basis of this discovery, we have provided a new and improved type of deinking process which is capable of operation according to several modifications depending upon the type of stock under treatment.

In the accompanying drawing we have shown flow sheets for two modifications of our process. Referring to the drawing, Figure 1 is a flow sheet of one modification of the process suitable for making deinked pulp for ordinary purposes, and, Figure 2 is a flow sheet of a modification of the process suitable for making high grade white deinked pulp.

Referring to the process diagrammatically illustrated in Figure 1, which embodiment of the invention may be employed for making deinked pulp for ordinary purposes where a pulp of particularly high quality is not required, any desired or conventional deinking reagent delivered through the conduit 10 into the mixing container 11 is mixed with water introduced into the container 11 from the conduit 12. Preferably, the water is at an elevated temperature, say from 100° to 150° F., and preferably about 120° F.

The amount of water employed should be regulated, according to the amount of waste paper under treatment, to provide a suspension of from ten to sixty per cent. solids by weight, and preferably from ten to thirty-five per cent. density, when the water is mixed with the fiber to be treated.

The amount and character of the deinking agent employed will depend upon the character and quantity of fiber under treatment. For example, for each ton of waste paper to be treated we may use say 200 pounds of water glass. Optionally, we may use say 50 pounds of sodium metasilicate. A mixture of about 100 pounds of soda ash and 50 pounds of lime will also provide a suitable deinking reagent for treating a ton of ordinary waste paper. When groundwood paper, such as ordinary newsprint, is to be treated we have found it advantageous to use a mixture of an alkali metal salt of an amphoteric metal acid and an acidic soap-forming fatty body, such as a mixture of 200 pounds of water glass and 15 pounds of oleic acid, for each ton of waste paper to be treated.

In the case where cheaper grades of magazine and book stock which contain over 10–15 per cent groundwood are to be deinked, we have found it advantageous to use as a deinking reagent a fatty alcohol having more than 8 carbon atoms, such as lauryl alcohol, cetyl alcohol, undecyl alcohol or the like, or compounds or derivatives thereof, such as half-esters of fatty alcohols having more than 8 carbon atoms or alkalimetal salts thereof. For example, we may use half-esters having the type formula R H X, wherein R represents a hydrocarbon group, such as an alkyl group, H represents hydrogen, and X represents an acid radical, such as a sulfate, oxalate, phosphate or tartrate radical or the like. A specific example of this type of reagent is lauryl acid sulfate ester, or an alkali-metal salt thereof, such as its sodium salt.

Other derivatives of fatty alcohols having more than 8 carbon atoms which we may use are the reaction products of the fatty alcohols with soluble salts of amphoteric metal acids, such as soluble silicates, borates and the like, these derivatives being readily obtainable by mixing equimolecular proportions of a fatty alcohol having more than 8 carbon atoms, such as lauryl alcohol, and a soluble salt of an amphoteric metal acid, such as sodium silicate.

In using these fatty alcohols and fatty alcohol derivatives it is advantageous to use them with mild alkalies, such as sodium bicarbonate, soda ash, a dilute solution of caustic soda or the like, and soap or other conventional detergent may be additionally employed if desired. For ordinary practice, it will be found that effective deinking is obtained by the use of about 2–10 pounds of the fatty alcohol, such as lauryl alcohol, to each ton of waste paper being treated, about 200 pounds of a mild alkali such as sodium bicarbonate being dissolved in the water used to provide the suspension of waste paper which is subjected to treatment.

The solution of deinking reagent employed is continuously delivered from the container 11 through the conduit 13 into a mixer 14 where it is mixed with fiber continuously introduced into the mixer through conduit 15. The mixer 14 should be a high density mixing machine such as a Lannoye pulper, Baker mixer, rod mill, ball mill, hammer mill, or the like. Where a suspension of particularly high density is under treatment, the mixer 14 should be of a type capable of handling stock at consistencies higher than 50–60 per cent, such as a mixer of the Jones pulper type. The suspension of from ten to sixty per cent solids by weight which is formed by the continuous mixing of the proper proportion of the aqueous solution from the conduit 13 with a portion of the fiber delivered from the conduit 15 is mixed in the high density mixer 14. Of course, the process can obviously be carried out on batch scale if desired but continuous treatment is preferred for obvious reasons. Where the process is a continuous one and only a small proportion of the fiber and treating solution are mixed together at one time, a relatively short period of mixing, say five minutes, in the high density mixer 14 will be sufficient. However, where the process is practiced on a batch scale, the mixing in the high density mixer 14 should be for a longer period, say from ten to thirty minutes.

After treatment in the mixer 14, the suspension of fiber is conveyed by the conduit 16 to riffles 17 where it is first diluted to a suspension of from one-fourth of one per cent to one per cent solids by weight. The diluting water may be fresh water but, for economy of operation, it is preferable to dilute the suspension with water introduced from the first stage of a three-stage washer subsequently employed in the process and hereinafter referred to. As the suspension passes through the riffles 17 some extraneous material, such as pins, staples or the like, is removed. Thereafter the suspension is delivered from the riffles by means of the conduit 18 to screens 19 where any remaining extraneous matter is removed. Thereafter, the suspension is passed through the conduit 20 to the head box 21 of a conventional three-stage washer generally indicated by the reference numeral 22.

The stock under treatment passes in conventional manner through the three stages of the washer and the refined fiber is discharged through the outlet 23. The water which is withdrawn from the first stage of the washer is preferably delivered through conduit 24 to the riffles 17 where it is used to dilute the suspension being introduced into the riffles from the mixer.

As the partially washed fiber is about to be delivered from the first to the second stage of the washer 22 it is sprayed with water from the spray 25 which is supplied with water from the third stage of the washer through conduit 26.

The water which is withdrawn from the second stage of the washer 22 is delivered through conduit 27 to the conduit 20 where it is used to dilute the stock passing from the screens 19 to the head box 21 through the conduit 20. As the fibers are about to be delivered from the second to the third stage of the washer 22, the fibers are sprayed with fresh water supplied through the conduit 28 to a spray 29.

As stated above, the fully refined fibers are discharged from the third stage of the washer and are delivered through the conduit 23 to a chest or to a beater if the fibers are to be immediately employed for making paper.

In the practice of the process diagrammatically illustrated in Figure 2 of the drawing, a conventional or desired deinking reagent, which may be of the character referred to above in the description of the first embodiment of the present invention, is introduced from the conduit 30 into a container 31 where it is mixed with water from a conduit 32. As pointed out above, the water should preferably be at an elevated temperature, say from 100° to 150° F. From the container 31 the solution of deinking reagent is led through the conduit 33 into a mixer 34 which is a high density mixer which may be any of the types referred to above in the description of the mixer 14 shown in Figure 1. The treating solution from the tank 31 is mixed in the mixer 34 with waste paper which has previously been treated in a conventional duster 35 and a conventional shredder 36, from the latter of which devices the fiber is introduced into the mixer through the conduit 37.

The proportions of fiber, deinking reagent, and water which are employed may be the same as described above in connection with the embodiment of the process diagrammatically illustrated in Figure 1. The aqueous suspension of fibers which passes through the mixer 34 contains approximately from ten to sixty per cent, and preferably ten to thirty-five per cent, solids by weight. This suspension is treated in the mixer 34 for approximately five minutes, when the process is a continuous one, or for approximately ten to thirty minutes, if batch operation is employed. From the mixer 34 the high density suspension is passed through the conduit 38 into riffles 39 where it is initially diluted to approximately a suspension of from one-fourth of one per cent to one per cent solids by weight. Fresh water may be used to dilute the suspension but it is preferable, in the interest of economy, to employ water discharged from a washer subsequently used in the process and hereinafter referred to. From the riffles 39 the dilute suspension is passed through the conduit 40 into screens 41 where extraneous matter not removed in the riffles 39 is removed. From the screens 41 the dilute suspension of stock is delivered through the conduit 42 into a thickener 43, which may be a conventional decker or wet machine or the like. In the thickener 43 a portion of the water present in the suspension is withdrawn and discharged to waste through the conduit 44, the suspension preferably being concentrated until it has a concentration of about from five to thirty-five per cent solids by weight. From the thickener 43 the stock is passed through the conduit 45 to a refiner 46 which may be a Jordan or other refiner such as a Weiner refiner, Lannoye pulper or other high density mixer.

Where rag stock, sulfite stock or soda stock is being treated, it is desirable to mix with the stock a small proportion of bleach during the passage of the stock from the thickener 43 to the refiner 46. In this case, a conventional bleach is delivered through the conduit 47 to a container 48 from which the bleach may be conveyed through the conduit 49 to the conduit 45. Where groundwood stock is being treated, the step of adding bleach to the thickened stock passing from the thickener 43 to the refiner 46 should be omitted. Where a bleach is employed at this point, any conventional bleach may be used, for example, a conventional bleach corresponding to about one-half of one per cent chlorine on the weight of the dry fiber.

The thickened stock is passed through the refiner 46 in conventional manner and delivered through the conduit 50 to the head box 51 of the three-stage washer designated generally by the numeral 52. The three-stage washer is of conventional type and the stock passes through the washer in conventional manner. The water withdrawn from the first stage of the washer is preferably conveyed through the conduit 52 to the head of the riffles 39 where it is used to dilute the high density stock delivered to the riffles from the mixer 34.

As the partially washed fibers are about to be delivered to the second stage of the washer they are sprayed with water from the spray 53 which is supplied with the water withdrawn from the third stage of the washer 52 and delivered to the spray 53 through the conduit 54.

The water withdrawn during the second stage of the washing operation is preferably conveyed through conduit 55 to conduit 50 where it is used to dilute the thickened stock passing from the refiner 46 to the head box 51 of the washer 52. As the washed fibers are about to be discharged from the second stage to the third stage of the washer they are sprayed with fresh water delivered through the conduit 56 to a spray 57. The fibers are given a final washing in the third stage of the washer and are discharged therefrom through the conduit 58. As stated above, the water withdrawn from the third stage of the washer is delivered through the conduit 54 to the spray 53.

While in the examples of our process set forth above we disclose the simultaneous addition of waste paper and deinking reagent solution to the high-density mixers 14 and 34, and the pulping of the waste paper in the presence of the deinking reagent, we have found that with certain types of stocks, such as hard sized stocks, the waste paper may be initially pulped and the deinking reagent then added to the thick pulped stock, the balance of the process being carried on as described.

As a result of the process described above, continuous deinking is provided and speedier and more effective deinking is accomplished than in the conventional deinking processes where low density suspensions are treated with a deinking reagent in a beater or digester. In a conventional deinking process where a suspension of say five per cent solids by weight is treated with a deinking agent in a beater or digester, the time required for deinking is generally about six hours. In the present process the deinking is accomplished in a relatively few minutes and commercial operation of the process has demonstrated that the quality of pulp produced is greatly superior to that produced in the conventional low density deinking processes.

While we have described in detail the preferred embodiments of our invention, it is to be understood that the details of procedure, the arrangement of steps, the proportions of ingredients and like factors may be considerably varied without departing from the spirit of the invention or the scope of the subjoined claims.

We claim:

1. The process of reclaiming fiber from waste paper which comprises subjecting an aqueous suspension of the waste paper of from ten to sixty percent density to a mechanical mixing action in the presence of a deinking reagent, adding water to the resulting mass to provide a dilute suspension, removing extraneous solid matter from the mass, removing a portion of the liquid present to provide a suspension of from five to thirty-five per cent density, adding bleach to the mass, subjecting the resulting mass to a mechanical mixing action, and recovering and washing the resulting fiber.

2. The process of reclaiming fiber from waste paper which comprises dusting and shredding the waste paper, mixing the waste paper with an aqueous solution of a deinking reagent to provide a suspension of from ten to sixty per cent density, subjecting the resulting suspension to a mechanical mixing action, adding water to the resulting mass to provide a dilute suspension, removing extraneous solid matter from the dilute suspension, removing a portion of the liquid present to provide a suspension of from five to thirty-five per cent density, adding bleach to the mass, subjecting the resulting mass to a mechanical mixing action, and recovering and washing the resulting fiber.

3. The process of reclaiming fiber from waste paper comprising groundwood paper which comprises subjecting an aqueous suspension of the waste paper of from ten to sixty per cent density to a mechanical mixing action in the presence of a deinking reagent comprising an alkali metal salt of an amphoteric metal acid and an acidic fatty body, adding water to the resulting mass to provide a dilute suspension, separating extraneous solid matter therefrom, subsequently adjusting the proportion of liquid to fiber to provide a suspension of from five to thirty-five per cent density, subjecting the resulting mass to a mechanical mixing action, and recovering and washing the resulting fiber.

4. The process of reclaiming fiber from waste paper comprising groundwood paper which comprises subjecting an aqueous suspension of the waste paper of from ten to sixty per cent density to a mechanical mixing action in the presence of sodium silicate and oleic acid, adding water to the resulting mass to provide a dilute suspension, separating extraneous solid matter therefrom, removing a portion of the liquid present to provide a suspension of from five to thirty-five per cent density, subjecting the resulting mass to a mechanical mixing action, and recovering and washing the resulting fiber.

5. The process of reclaiming fiber from waste paper which comprises subjecting an aqueous suspension of the waste paper of from ten to sixty per cent density to the action of a deinking composition comprising a reagent selected from the group consisting of fatty alcohols having more than eight carbon atoms, half-esters of such fatty alcohols, alkali-metal salts of such half-esters, and reaction products of such alcohols with alkali-metal salts of amphoteric metal acids, and recovering and washing the resulting fiber.

6. A process of reclaiming fiber from waste paper which comprises subjecting an aqueous suspension of the waste paper of from ten to sixty per cent density to the action of a deinking composition comprising a reagent selected from the group consisting of fatty alcohols having more than eight carbon atoms, half-esters of such fatty alcohols, alkali-metal salts of such half-esters, and reaction products of such alcohols with alkali-metal salts of amphoteric metal acids, adding water to the resulting mass to provide a dilute suspension, separating extraneous solid matter therefrom, subsequently adjusting the proportion of liquid to fiber to provide a suspension of from five to thirty-five per cent density, subjecting the resulting mass to a mechanical mixing action, and recovering and washing the resulting fiber.

7. A continuous process of reclaiming fiber from waste paper which comprises continuously mixing water with waste paper to provide a suspension of from ten to sixty percent density, subjecting the resulting suspension to a mechanical mixing action in the presence of a deinking composition comprising a reagent selected from the group consisting of fatty alcohols having more than eight carbon atoms, half-esters of such fatty alcohols, alkali-metal salts of such half-esters and reaction products of such alcohols with alkali-metal salts of amphoteric metal acids, adding water to the resulting mass to provide a dilute suspension, separating extraneous solid matter therefrom, removing a portion of the liquid present to provide a suspension of from five to thirty-five per cent density, subjecting the resulting mass to a mechanical mixing action, and recovering and washing the resulting fiber.

8. The process of reclaiming fiber from waste paper which comprises subjecting waste paper in an aqueous suspension of from ten to thirty-five per cent density to a mechanical disintegrating action in the presence of a deinking reagent, thereafter diluting the resulting mass with water to facilitate the removal of extraneous solid matter therefrom, separating extraneous solid matter from the diluted suspension, removing a portion of the liquid present to provide a suspension of from five to thirty-five per cent density, subjecting the resulting mass to a mechanical disintegrating action, and washing and recovering the resulting fiber.

FRANCIS H. SNYDER.
STANLEY F. M. MACLAREN.